United States Patent
Katano

(10) Patent No.: US 11,566,752 B2
(45) Date of Patent: Jan. 31, 2023

(54) HIGH-PRESSURE TANK AND METHOD FOR MANUFACTURING HIGH-PRESSURE TANK

(71) Applicant: TOYOTA JIDOSHA KABUSHIKI KAISHA, Toyota (JP)

(72) Inventor: Koji Katano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/336,726

(22) Filed: Jun. 2, 2021

(65) Prior Publication Data
US 2022/0034450 A1  Feb. 3, 2022

(30) Foreign Application Priority Data
Jul. 31, 2020 (JP) .............................. JP2020-130239

(51) Int. Cl.
  *F17C 1/06* (2006.01)
(52) U.S. Cl.
  CPC ........ *F17C 1/06* (2013.01); *F17C 2201/0109* (2013.01); *F17C 2203/013* (2013.01); *F17C 2203/0624* (2013.01); *F17C 2203/0673* (2013.01); *F17C 2209/2163* (2013.01); *F17C 2221/012* (2013.01); *F17C 2270/0184* (2013.01)

(58) Field of Classification Search
CPC ................ F17C 1/06; F17C 2201/0109; F17C 2203/013; F17C 2203/0624; F17C 2203/0673; F17C 2209/2163; F17C 2221/012; F17C 2270/0184; F17C 2201/056; F17C 2203/0619; F17C 2203/0663; F17C 2205/0397; F17C 2209/2154

USPC .......................................... 220/586, 589, 590
See application file for complete search history.

(56) References Cited

U.S. PATENT DOCUMENTS

| | | | | |
|---|---|---|---|---|
| 3,073,475 | A * | 1/1963 | Fingerhut | B65D 11/02 220/62.19 |
| 11,298,868 | B2 * | 4/2022 | Katano | B29C 53/587 |
| 2003/0111473 | A1 * | 6/2003 | Carter | F17C 13/025 220/586 |

(Continued)

FOREIGN PATENT DOCUMENTS

| | | |
|---|---|---|
| CA | 3 011 556 A1 | 8/2017 |
| DE | 102018222302 A1 * | 6/2020 ........... B29C 70/521 |

(Continued)

OTHER PUBLICATIONS

U.S. Appl. No. 17/231,093, filed Apr. 15, 2021.

(Continued)

*Primary Examiner* — John K Fristoe, Jr.
*Assistant Examiner* — Laura E. Parker
(74) *Attorney, Agent, or Firm* — Finnegan, Henderson, Farabow, Garrett & Dunner, LLP

(57) ABSTRACT

A high-pressure tank includes a cylindrical portion including a fiber-reinforced resin and a dome portion including a fiber-reinforced resin. The cylindrical portion includes an axial fiber layer including a fiber oriented in a center axis direction of the high-pressure tank, and a circumferential fiber layer including a fiber oriented in a circumferential direction of the high-pressure tank. An end portion of the axial fiber layer and an end portion of the dome portion are joined to each other.

8 Claims, 5 Drawing Sheets

(56) References Cited

U.S. PATENT DOCUMENTS

| | | | | |
|---|---|---|---|---|
| 2012/0000916 A1* | 1/2012 | Kleber | ................... | F16J 12/00 |
| | | | | 156/172 |
| 2012/0234840 A1* | 9/2012 | Strassburger | ......... | B29C 70/462 |
| | | | | 156/196 |
| 2018/0340655 A1* | 11/2018 | Lee | ...................... | F17C 13/002 |
| 2021/0221081 A1* | 7/2021 | Katano | ................ | B29C 41/042 |
| 2022/0032531 A1 | 2/2022 | Katano | | |

FOREIGN PATENT DOCUMENTS

| | | |
|---|---|---|
| JP | 2012-149739 A | 8/2012 |
| JP | 2017-180521 A | 10/2017 |
| JP | 2019-044937 A | 3/2019 |
| JP | 2019-507851 A | 3/2019 |
| WO | WO 2010/116529 A1 | 10/2010 |

OTHER PUBLICATIONS

Office Action issued in U.S. Appl. No. 17/231,093 dated Oct. 18, 2021.

Notice of Allowance issued in U.S. Appl. No. 17/231,093 dated Dec. 27, 2021.

* cited by examiner

HIGH-PRESSURE TANK AND METHOD FOR MANUFACTURING HIGH-PRESSURE TANK

CROSS-REFERENCE TO RELATED APPLICATION

This application claims priority to Japanese Patent Application No. 2020-130239 filed on Jul. 31, 2020, incorporated herein by reference in its entirety.

BACKGROUND

1. Technical Field

The present disclosure relates to a high-pressure tank and a method for manufacturing a high-pressure tank.

2. Description of Related Art

Japanese Unexamined Patent Application Publication No. 2012-149739 describes a high-pressure tank manufacturing method including a step of forming a reinforcement layer by winding resin-impregnated fibers on an outer surface of a lining via filament winding.

SUMMARY

As a new high-pressure tank manufacturing method to replace the conventional method, the inventor of the present disclosure invented a method in which a pipe portion with fibers oriented in a circumferential direction of a high-pressure tank, and dome portions are formed separately and then joined to each other to form a joined body forming a part of a reinforcement layer. In this manufacturing method, since the pipe portion and the dome portions are joined, parts in which the pipe portion and the dome portions are joined are susceptible to stress in an axial direction of the high-pressure tank. The inventor of the present disclosure found that since the pipe portion is formed of fibers oriented in the circumferential direction of the high-pressure tank alone, there is a problem in that stress in the axial direction of the high-pressure tank is less likely to be received by the fibers. Therefore, there has been a demand for further improvement in strength of the high-pressure tank.

The present disclosure can be implemented according to the following aspects.

(1) An aspect of the present disclosure provides a high-pressure tank including a cylindrical portion including a fiber-reinforced resin and a dome portion including a fiber-reinforced resin. In the high-pressure tank, the cylindrical portion includes an axial fiber layer including a fiber oriented in a center axis direction of the high-pressure tank, and a circumferential fiber layer including a fiber oriented in a circumferential direction of the high-pressure tank, and an end portion of the axial fiber layer and an end portion of the dome portion are joined to each other.

The high-pressure tank of this aspect enables the axial fiber layer to receive stress in the axis direction of the high-pressure tank. Therefore, the high-pressure tank can have enhanced strength in comparison with a high-pressure tank including no axial fiber layer.

(2) In the high-pressure tank of the above aspect, the axial fiber layer may be disposed on the inner side of the circumferential fiber layer.

According to the high-pressure tank of this aspect, upon an increase in inner pressure of the high-pressure tank, the axial fiber layer expands outward relative to the center axis of the high-pressure tank. Since the circumferential fiber layer does not easily expand outward relative to the center axis, enabling curbing expansion of the axial fiber layer in the outward direction relative to the center axis.

(3) In the high-pressure tank of the above aspect, the end portion of the dome portion may be disposed between the axial fiber layer and the circumferential fiber layer.

According to the high-pressure tank of this aspect, upon the axial fiber layer expanding outward relative to the center axis of the high-pressure tank because of an increase in pressure inside the high-pressure tank, the end portion of the dome portion is pressed against the circumferential fiber layer. Consequently, it is possible to more firmly join the dome portion and the axial fiber layer, enabling enhancement in strength in the axial direction of the high-pressure tank.

(4) Another aspect of the present disclosure provides a method for manufacturing a high-pressure tank including a cylindrical portion including a fiber-reinforced resin and a dome portion including a fiber-reinforced resin. The method for manufacturing the high-pressure tank includes: (a) a step of preparing an axial fiber layer included in the cylindrical portion, the axial fiber layer including a fiber oriented in an axial direction of the high-pressure tank, and the dome portion; (b) a step of forming a joined body by joining an end portion of the axial fiber layer and an end portion of the dome portion to each other; and (c) a step of forming a circumferential fiber layer including a fiber oriented in a circumferential direction of the high-pressure tank, on the outer side or the inner side of the axial fiber layer.

The method for manufacturing a high-pressure tank of this aspect enables manufacturing a high-pressure tank that makes an axial fiber layer receive stress in an axial direction of the high-pressure tank. The high-pressure tank can have enhanced strength in comparison with a high-pressure tank including no axial fiber layer.

(5) In the method for manufacturing a high-pressure tank of the above aspect, the (c) step may include a step of forming at least a part of the circumferential fiber layer on the outer side of the axial fiber layer.

According to the method for manufacturing a high-pressure tank of this aspect, since at least a part of the circumferential fiber layer can be formed on the outer side of the axial fiber layer, the circumferential fiber layer in the course of being wound can be checked in comparison with a case where a circumferential fiber layer is formed on the inner side of an axial fiber layer. Therefore, it is possible to enhance productivity of the high-pressure tank.

(6) In the method for manufacturing a high-pressure tank of the above aspect, the (b) step may be a step of forming a joined body by joining an inner surface of the end portion of the dome portion and an outer surface of the end portion of the axial fiber layer, and the (c) step may further include a step of forming another part of the circumferential fiber layer on the outer side of the end portion of the dome portion.

In the method for manufacturing a high-pressure tank of this aspect, another part of the circumferential fiber layer can be formed on the outer side of the end portion of the dome portion, and thus, a high-pressure tank that curbs outward movement of the end portion of the dome portion can be manufactured.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. Embodiment

Figure 1:
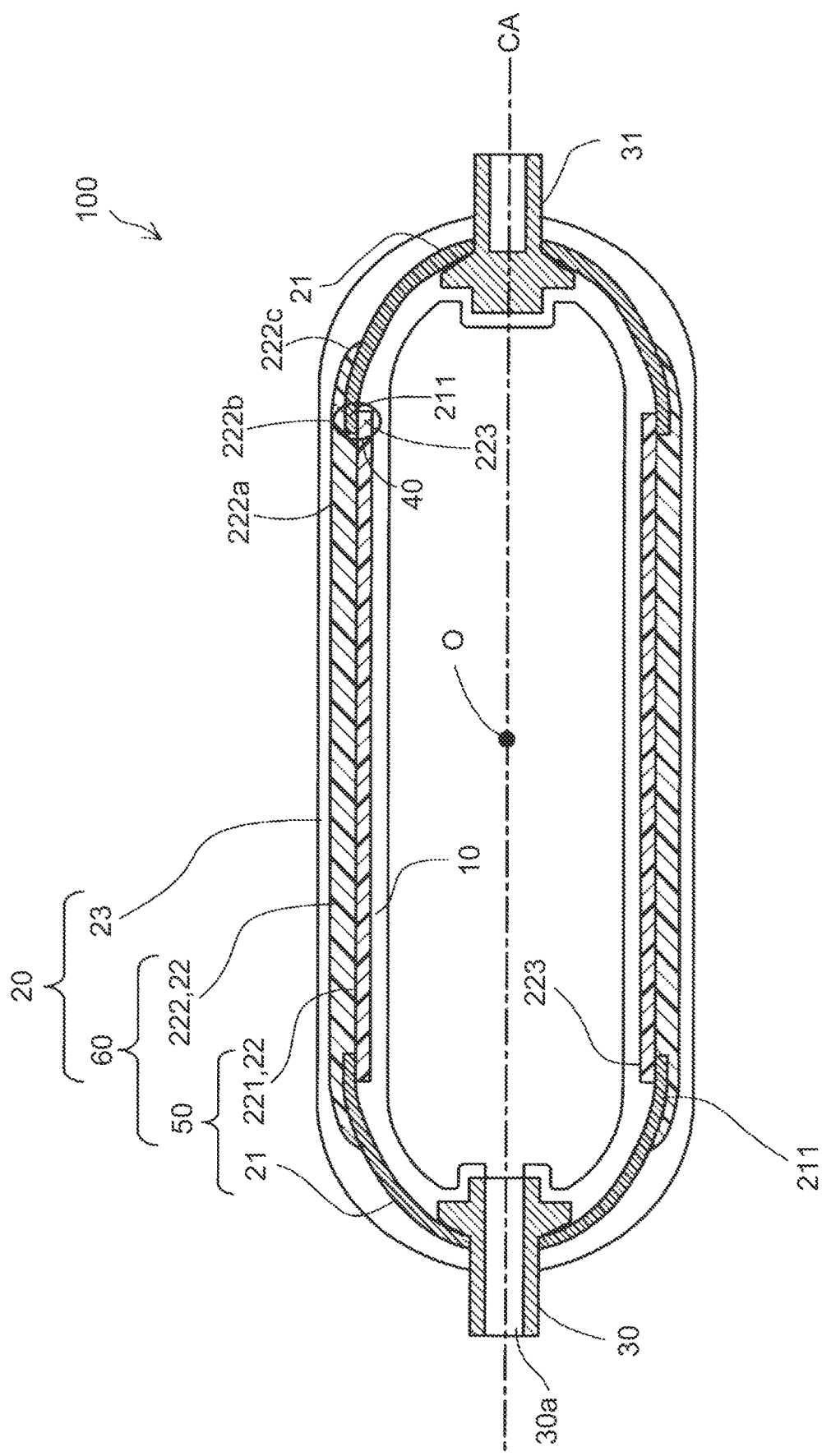
FIG. 1 is a sectional view illustrating a configuration of a high-pressure tank according to the present embodiment.

FIG. 1 is a sectional view illustrating a configuration of a high-pressure tank 100 according to the present embodiment. The high-pressure tank 100 is a storage container that stores a high-pressure fluid such as high-pressure hydrogen. In order to, for example, supply hydrogen to a fuel battery, the high-pressure tank 100 is mounted in a fuel battery vehicle. Note that the high-pressure tank 100 may be mounted not only in a fuel battery vehicle, but also in any of other vehicles including an electric vehicle, a hybrid vehicle, etc., or may be mounted in any of other moving bodies such as a ship, a plane, a robot, etc. Also, the high-pressure tank 100 may be provided in a fixed facility such as a house or a building.

The high-pressure tank 100 includes a lining 10 and a reinforcement layer 20. The lining 10 forms an inner wall of the high-pressure tank 100. The lining 10 is formed of a resin having a barrier property to prevent leakage of gas charged in inner space to the outside. For the resin forming the lining 10, for example, a thermoplastic resin such as polyamide, polyethylene, an ethylene-vinylalcohol copolymer resin, polyester or nylon or a thermosetting resin such as epoxy can be used.

The reinforcement layer 20 is a fiber-reinforced resin layer for reinforcing the lining 10. The reinforcement layer 20 is disposed on an outer surface of the lining 10. The reinforcement layer 20 includes a second joined body 60 including two dome portions 21 and a cylindrical portion 22, and an outer helical layer 23. The reinforcement layer 20 can be called "reinforcement body". Each of the dome portions 21, the cylindrical portion 22 and the outer helical layer 23 included in the reinforcement layer 20 is formed by fibers impregnated with a resin. For the fibers forming each of the dome portions 21, the cylindrical portion 22 and the outer helical layer 23 included in the reinforcement layer 20, e.g., glass fibers or carbon fibers can be used. For the resin with which the fibers are impregnated, for example, a thermosetting resin such as a phenol resin, a melamine resin or an epoxy resin can be used. The second joined body 60 will be described later.

Each dome portion 21 has a shape having outer diameter gradually increasing from one end thereof toward an open end 211, which is the other end portion thereof. The open end 211 is an end closer to a center O of the high-pressure tank 100 of the opposite ends in an axis CA direction, which is a center axis of the high-pressure tank 100, of the dome portion 21. The end on the opposite side of the dome portion 21 from the open end 211 is in contact with a first ferrule 30 or a second ferrule 31, which will be described later. In FIG. 1, each dome portion 21 has a shape obtained by cutting a part of a substantially spherical hollow body. Note that the dome portions can have any of various shapes other than the shape.

The cylindrical portion 22 includes an axial fiber layer 221 and a circumferential fiber layer 222. The axial fiber layer 221 has a function that receives stress in the direction of the axis CA of the high-pressure tank 100, the stress being generated by inner pressure. The axial fiber layer 221 has a substantial cylindrical shape with opposite ends open. The axial fiber layer 221 is formed such that the above-described fibers are oriented in the direction of the axis CA of the high-pressure tank 100. The fibers being oriented in the direction of the axis CA means that a direction of the fibers of the axial fiber layer 221 falls within a range of ±20 degrees relative to the direction of the axis CA of the high-pressure tank 100. From the perspective of enhancement in axial strength, it is preferable that the direction of the fibers of the axial fiber layer 221 fall within a range of ±10 degrees relative to the direction of the axis CA of the high-pressure tank 100.

The axial fiber layer 221 is disposed on the inner side of the circumferential fiber layer 222. The axial fiber layer 221 includes an axial end portion 223 at each of the opposite ends of the axial fiber layer 221. Joining portions 40 are formed by joining inner surfaces of the open ends 211 of each dome portion 21 and outer surfaces of the axial end portions 223 of the axial fiber layers 221, whereby a joined body 50 including the dome portions 21 and the axial fiber layer 221 is formed. As a result of the joining portions 40 being formed, the axial fiber layer 221 can receive stress applied to the joining portions 40 in the axis CA direction when the inner pressure of the high-pressure tank 100 has increased. Consequently, the joining portions 40 have enhanced strength in the axis CA direction in comparison with a high-pressure tank 100 including no axial fiber layer 221. The joined body 50 further includes the first ferrule 30 and the second ferrule 31 joined to the respective dome portions 21.

The circumferential fiber layer 222 has a function that receives a force generated outward relative to the axis CA of the high-pressure tank 100 because of the inner pressure. The circumferential fiber layer 222 has a substantially cylindrical shape with opposite ends open. The circumferential fiber layer 222 is formed such that the above-described fibers are oriented in the circumferential direction of the high-pressure tank 100. The fibers being oriented in the circumferential direction of the high-pressure tank 100 means that the direction of the fibers of the circumferential fiber layer 222 falls within a range of ±20 degrees relative to the circumferential direction of the high-pressure tank 100. From the perspective of enhancement in circumferential strength, it is preferable that the direction of the fibers of the circumferential fiber layer 222 fall within a range of ±10 degrees relative to the circumferential direction of the high-pressure tank 100.

The circumferential fiber layer 222 is disposed on the outer side of the axial fiber layer 221, and the second joined body 60 is formed by the circumferential fiber layer 222 covering an outer surface of the axial fiber layer 221 except the axial end portions 223. Upon an increase in inner pressure of the high-pressure tank 100, the axial fiber layer 221 may expand outward relative to the axis CA of the high-pressure tank 100. On the other hand, the circumferential fiber layer 222 does not easily expand outward relative to the axis CA, enabling curbing expansion of the axial fiber layer 221 in the outward direction relative to the axis CA.

In the present embodiment, the open end 211 of each dome portion 21 is disposed between the axial fiber layer 221 and the circumferential fiber layer 222 of the cylindrical portion 22. Upon the axial fiber layer 221 expanding outward relative to the axis CA of the high-pressure tank 100 because of an increase in pressure inside the high-pressure tank 100, the open ends 211 are pressed against the circumferential fiber layer 222 by the axial end portions 223 of the axial fiber layer 221. Consequently, it is possible to more firmly join the open ends 211 of the dome portion 21 and the axial end portions 223 of the axial fiber layer 221, enabling enhancement in strength in the axis CA direction of the high-pressure tank 100.

The outer helical layer 23 is a layer formed by a fiber-reinforced resin being helically wound on an outer surface of the second joined body 60 including the joined body 50 and the circumferential fiber layer 222. The outer helical layer 23 prevents movement, in a direction from the center of the high-pressure tank 100 to the outside, of the dome portions 21 when the inner pressure of the high-pressure tank 100 becomes high.

The first ferrule 30 includes a communication hole 30a via which space inside the lining 10 and outer space communicate with each other. A connection device including a valve for charging and discharging gas is installed in the communication hole 30a. The second ferrule 31 includes no communication hole 30a that communicates with the outer space. However, the second ferrule 31 may include a communication hole 30a. Also, the second ferrule 31 may be omitted. The first ferrule 30 and the second ferrule 31 may be formed of a metal such as aluminum or stainless steel.

Figure 2:
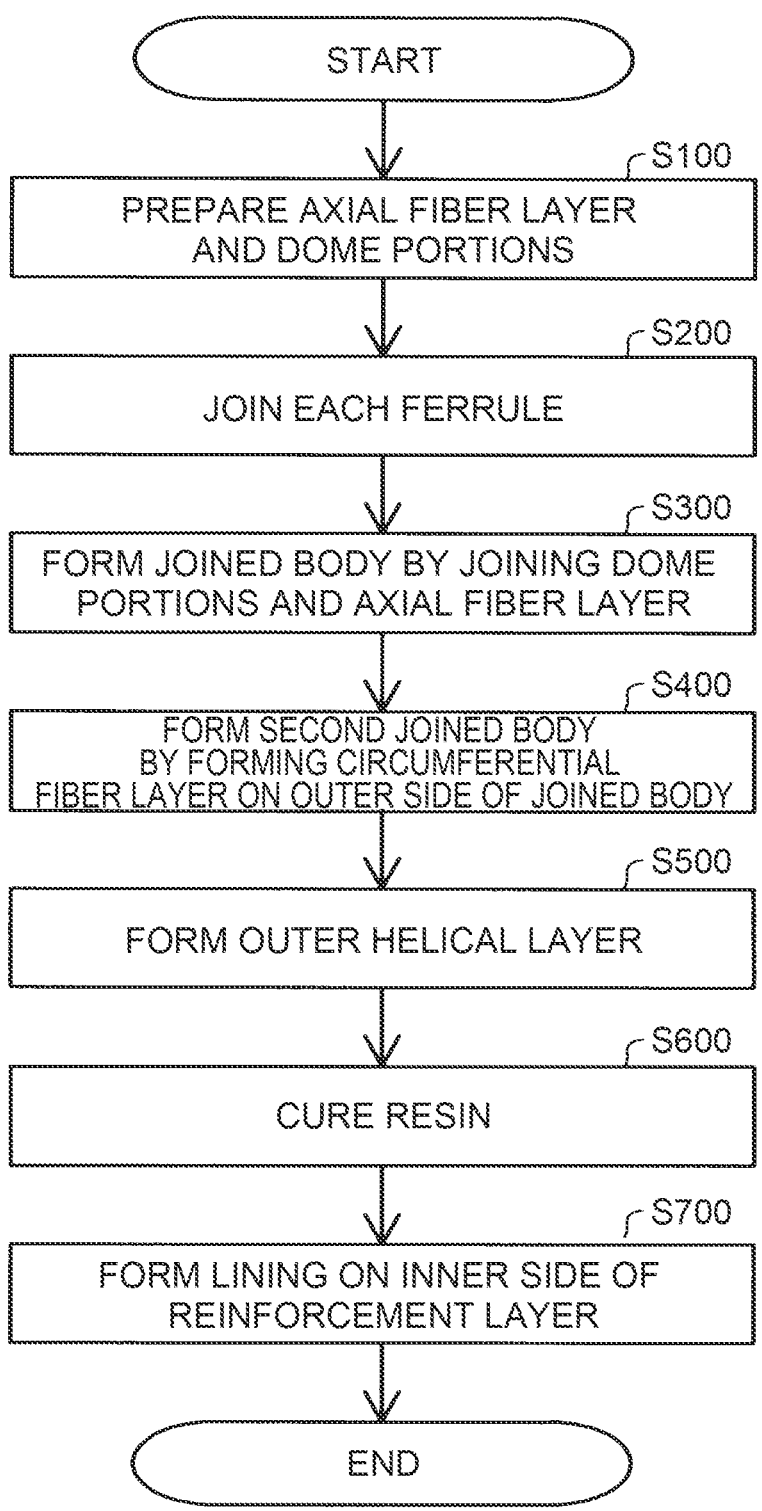
FIG. 2 is a flowchart illustrating a method for manufacturing the high-pressure tank.
Figure 3:
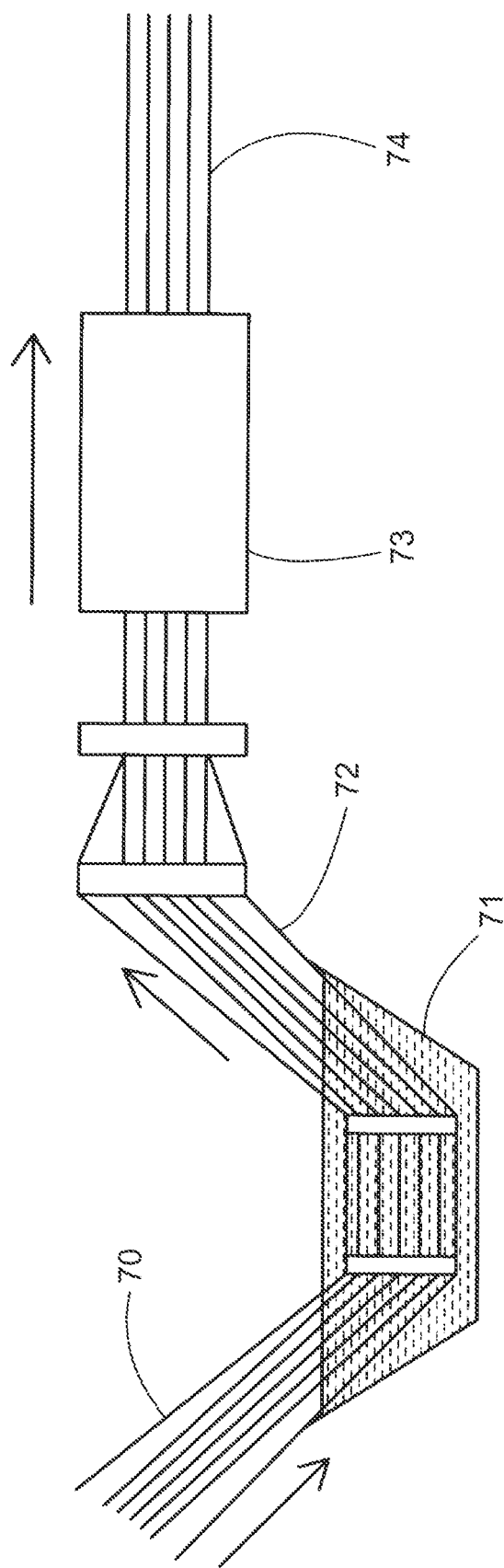
FIG. 3 is a diagram illustrating an example of a method for forming an axial fiber layer.

FIG. 2 is a flowchart illustrating a method for manufacturing the high-pressure tank 100. FIG. 3 is a diagram illustrating an example of a method for forming the axial fiber layer 221. In step S100 in FIG. 2, an axial fiber layer 221 and dome portions 21 are prepared. In the present embodiment, the axial fiber layer 221 is formed using pultrusion (see FIG. 3). In pultrusion, fibers 70 pulled out from a non-illustrated fiber rack in the arrow direction are immersed in an impregnation device 71 with a resin melted therein. Subsequently, fibers 72 impregnated with the resin are pulled into a die 73 and cured in the die 73. Subsequently, resin-reinforced fibers 74 are pulled out from the die 73 and cut. Use of pultrusion enables efficient formation of the axial fiber layer 221 oriented in the axis CA direction.

Where the resin for the axial fiber layer 221 is cured in step S100, "final curing" for completely curing the resin until a viscosity of the resin becomes stable may be performed or preliminary curing that stops short of final curing. In general, upon being heated, a viscosity of uncured thermosetting resin first decreases. Upon the heating being continued subsequently, the viscosity increases, and upon the heating being continued for a sufficient length of time, the viscosity of the resin reaches a target value or more and becomes stable. Based on this process, processing in which the viscosity increases again after a decrease of the viscosity and curing is continued even after the viscosity reaching a viscosity at the start of the heating again and is then terminated at any point of time before an end of final curing is referred to as "preliminary curing". If preliminary curing is performed in step S100 and final curing is performed in step S600, which will be described later, bonding can be performed with the viscosity of the resin for the axial fiber layer 221 before the final curing, enabling the axial fiber layer 221 to be more firmly joined to the dome portions 21 and the circumferential fiber layer 222.

Figure 4:
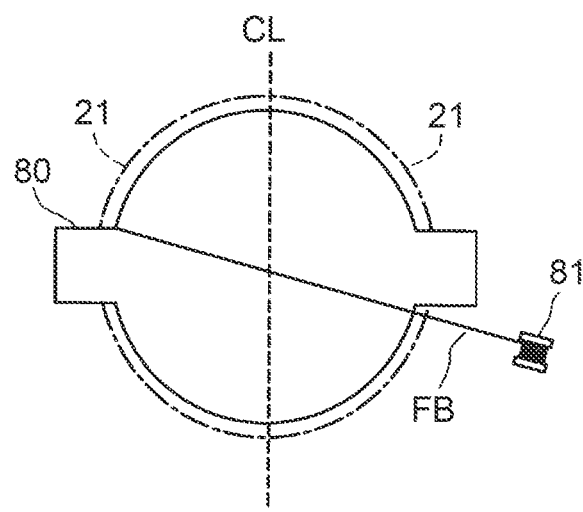
FIG. 4 is a diagram illustrating an example of a method for forming dome portions.

FIG. 4 is a diagram illustrating an example of a method for forming the dome portions 21. In the present embodiment, the dome portions 21 are formed by winding a fiber bundle FB on a mandrel 80 using filament winding. It is preferable that the mandrel 80 have an outer shape that is similar to an outer shape formed by two dome portions 21 being put together. In filament winding, the fiber bundle FB is wound on the mandrel 80 by moving a fiber bundle guide 81 while the mandrel 80 being rotated. In FIG. 4, the fiber bundle FB is helically wound on the mandrel 80. After an end of the winding of the fiber bundle FB, the wound fiber bundle FB is cut along a cutting line CL to obtain two dome portions 21.

In general, as methods for forming an object made of a fiber-reinforced resin, there are the following methods.

<Wet FW> Wet FW is a method in which immediately before a fiber bundle being wound, the fiber bundle is impregnated with a liquid resin with a viscosity decreased is immersed, and the fiber bundle impregnated with the resin is wound on a mandrel.

<Dry FW> Dry FW is a method in which a tow-prepreg obtained by a fiber bundle being impregnated with a resin in advance and being dried is prepared and the tow-prepreg is wound on the mandrel.

<Resin Transfer Molding (RTM)> RTM is a method in which molding is performed by installing fibers inside a pair of male and female molds, closing the molds and injecting a resin from a resin injection port to impregnate the fibers with the resin.

For filament winding, either wet FW or dry FW is usable. Note that the dome portions may be formed using any of methods such as RTM other than filament winding.

Curing of the resin for the dome portions 21 may be performed in step S100 or may be performed in step S600. Curing of the resin in this case may be final curing or preliminary curing. If preliminary curing is performed in step S100 and final curing is performed in step S600, bonding can be performed with a viscosity of the resin for the dome portions 21 before the final curing, enabling the dome portions 21 to be more firmly joined to the cylindrical portion 22 and to the outer helical layer 23. Where a diameter of the high-pressure tank 100 is changed, it is possible to respond to the change by increasing an amount of fibers wound for the dome portions 21 in step S100.

In step S200, the dome portions 21, the first ferrule 30 and the second ferrule 31 are joined. The dome portions 21, the first ferrule 30 and the second ferrule 31 can be joined using an adhesive or a glue. In step S300, inner surfaces of open ends 211 of the dome portions 21 prepared in step S200 and outer surfaces of axial end portions 223 of the axial fiber layer 221 are joined, whereby a joined body 50 is formed. In the joining in step S300, for an adhesive, a thermosetting resin such as an epoxy resin or a phenol resin can be used. It is possible that the open ends 211 and the axial end portions 223 are bonded in step S300; and the open ends 211 and the axial end portions 223 are joined by friction generated by inner pressure after formation of the high-pressure tank 100. Also, employment of a method using a combination of friction generated by inner pressure and an adhesive or the like enables more firmly joining the dome portions 21 and the axial end portion 223. Furthermore, as described above, the axial fiber layer 221 is formed using pultrusion and the dome portions 21 are formed by winding a fiber bundle FB on the mandrel 80. The outer side of the axial fiber layer 221 is formed in the shape of the die 73 and the inner side of the dome portions 21 is formed in the shape of the mandrel 80, and thus, the axial fiber layer 221 and the dome portions 21 can easily be fitted to each other. As a result of the axial fiber layer 221 and the dome portions 21 being fitted to each other, the axial fiber layer 221 and the dome portions 21 are more firmly joined, enabling enhancement in strength of the high-pressure tank 100.

Figure 5:
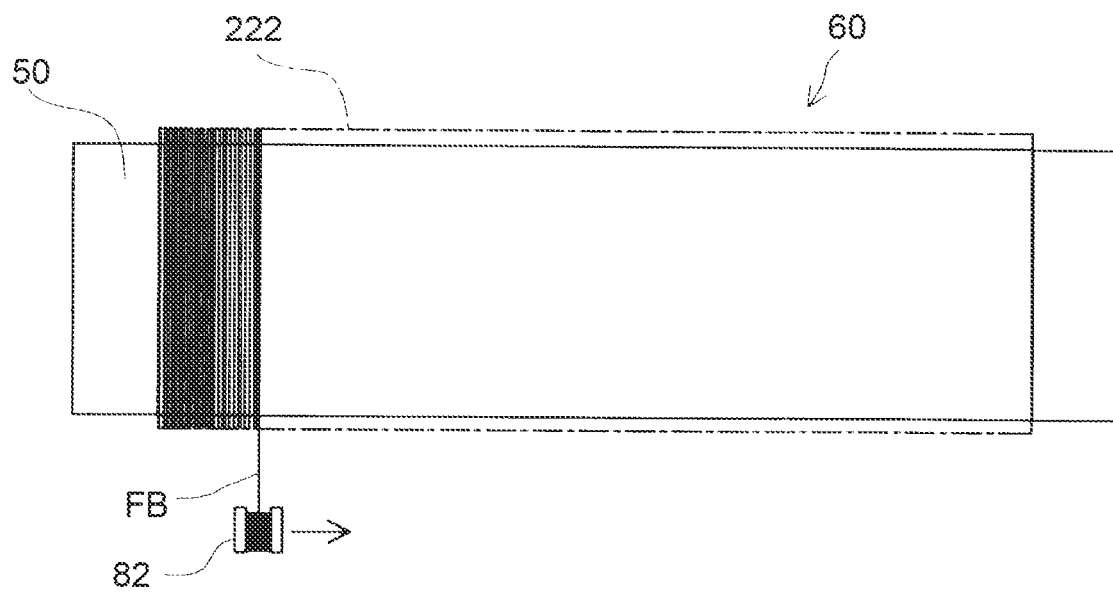
FIG. 5 is a diagram illustrating a method for forming a circumferential fiber layer.

FIG. 5 is a diagram illustrating a method for forming the circumferential fiber layer 222. In step S400, a second joined body 60 is formed by forming a circumferential fiber layer 222 on the outer side of the joined body 50. The circumferential fiber layer 222 can be formed by winding a fiber bundle FB on the joined body 50 prepared in step S300, using filament winding. In the filament winding, the fiber bundle FB is wound on the joined body 50 by moving a fiber bundle guide 82 while the joined body 50 being rotated. As illustrated in FIG. 5, the joined body 50 can be used as a mandrel, and thus, there is no need to provide another shaft. Therefore, it is possible to bring the circumferential fiber layer 222 into close contact with the joined body 50. Also, in the method for forming the circumferential fiber layer 222, the circumferential fiber layer 222 in the course of being wound can be checked in comparison with a case where a circumferential fiber layer 222 is formed on the inner side of the axial fiber layer 221. Therefore, it is possible to enhance productivity of the high-pressure tank 100.

As illustrated in FIG. 1, a part of the circumferential fiber layer 222 is formed on the outer surface of the axial fiber layer 221 (see 222a in FIG. 1). Other parts of the circumferential fiber layer 222 are formed on the outer sides of the joining portions 40 in which the axial fiber layer 221 and the open ends 211 overlap with each other (see 222b in FIG. 1). Still other parts of the circumferential fiber layer 222 are formed on outer surfaces of the dome portions 21 (see 222c in FIG. 1). As a result of the circumferential fiber layer 222 being formed on the outer sides of the open ends 211, a high-pressure tank 100 that curbs outward movement of the open ends 211 can be manufactured (see 222b in FIG. 1) in comparison with a high-pressure tank 100 with no circumferential fiber layer 222 formed on the outer sides of the open ends 211. Note that no circumferential fiber layer 222 may be formed on the outer sides of the dome portions 21 except the open ends 211 (see 222c in FIG. 1).

Note that where a circumferential fiber layer 222 is formed on the inner side of the axial fiber layer 221, the circumferential fiber layer 222 can be formed by Centrifugal Winding (CW) after the axial fiber layer 221 being formed in step S100. CW is a method in which a tubular member is formed by attaching a fiber sheet to an inner surface of a cylindrical mold that is rotating. For the fiber sheet, a resin sheet impregnated with a resin in advance may be used or a fiber sheet impregnated with no resin may be used. In the latter case, after the fiber sheet is rolled into a tubular shape, a resin is poured into the mold to impregnate the fiber sheet with the resin.

Where the circumferential fiber layer is formed via CW, the dome portions are formed after formation of the cylindrical portion. After the formation of the cylindrical portion, the open ends are joined to the outer sides of the axial end portions. In this case, unlike the second joined body 60 above, the open ends are not disposed on the outer side of the axial fiber layer and the inner side of the circumferential fiber layer. The shape in the present embodiment in which the open ends 211 are formed on the outer side of the axial fiber layer 221 and the inner side of the circumferential fiber layer 222 can be considered as making the joining portions 40 have higher strength. Therefore, in the present embodiment, a method in which the circumferential fiber layer 222 is formed on the outer side of the axial fiber layer 221 is employed. Note that as the method for forming the circumferential fiber layer 222 on the outer side of the axial fiber layer 221, sheet winding can be employed, other than filament winding. In sheet winding, using the axial fiber layer 221 as a mandrel, sheet-like fibers are wound along a circumferential direction of the axial fiber layer 221.

Figure 6:
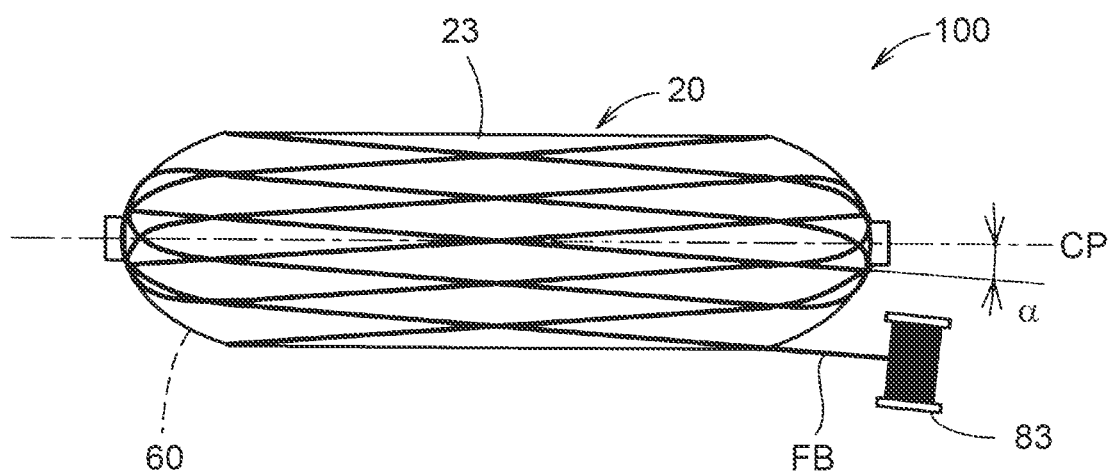
FIG. 6 is a method illustrating a method for forming an outer helical layer.

FIG. 6 is a diagram illustrating a method for forming the outer helical layer 23. In step S500, a fiber bundle FB is wound on the outer side of the second joined body 60 using filament winding to form an outer helical layer 23, whereby a reinforcement layer 20 is formed. In this filament winding, the fiber bundle FB is wound on the second joined body 60 by moving a fiber bundle guide 83 with an axis CP of the second joined body 60 as a center while the second joined body 60 being rotated. As described above, the outer helical layer 23 has a function that prevents movement, in the direction from the center of the high-pressure tank 100 to the outside, of the dome portions 21 when the inner pressure of the high-pressure tank 100 becomes high. In order to provide this function, it is preferable that a winding angle α of the fiber bundle FB be equal to or smaller than 45 degrees. The winding angle α is an angle of the fiber bundle FB relative to the axis CP of the second joined body 60. For the filament winding, either wet FW or dry FW is usable.

The inventor of the present disclosure found that in the case of a high-pressure tank including no axial fiber layer 221, for example, if a diameter of the high-pressure tank is doubled, fibers for forming an outer helical layer needs to be quadrupled. Since it is difficult to wind an outer helical layer at high speed, an increase in diameter of a high-pressure tank including no axial fiber layer results in an increase in length of time for manufacturing the high-pressure tank. In the high-pressure tank of the present disclosure, the axial fiber layer 221 can receive stress in the axial direction of the high-pressure tank 100, and thus, even if the diameter of the high-pressure tank 100 is increased, there is no need to quadruple the fibers for forming the outer helical layer 23. Therefore, in comparison with a high-pressure tank including no axial fiber layer, an increase in diameter of the high-pressure tank 100 does not result in an increase in length of time for manufacturing the high-pressure tank 100. Also, since equipment for forming the outer helical layer 23 can also be used, productivity of the high-pressure tank 100 can be enhanced.

In step S600, the uncured resin of the reinforcement layer 20 is cured. This curing is the aforementioned final curing. In step S700, a lining 10 is formed on the inner side of the reinforcement layer 20. In the present embodiment, the lining 10 can be formed by putting a liquid material for the lining to the inside of the reinforcement layer 20 and curing the material for the lining while the reinforcement layer 20 being rotated. In this way, the high-pressure tank 100 can be manufactured.

Note that the lining 10 may be formed according to a method other than the above-described method. For example, a lining, an axial fiber layer and dome portions are formed separately and the lining, the axial fiber layer, the dome portions, a first ferrule and a second ferrule are joined. Subsequently, a circumferential fiber layer and an outer helical layer may be formed via filament winding.

B. Other Embodiments (B1) In the above embodiment, the axial fiber layer 221 is disposed on the inner side of the circumferential fiber layer 222. However, a circumferential fiber layer may be disposed on the inner side of an axial fiber layer.

(B2) In the above embodiment, the open ends 211 are disposed between the axial fiber layer 221 and the circumferential fiber layer 222 by a part of the circumferential fiber layer 222 being formed on the outer side of the axial fiber layer 221 and other parts of the circumferential fiber layer 222 being formed on the outer sides of the open ends 211. However, an entirety of a circumferential fiber layer may be formed on the outer side of an axial fiber layer and no circumferential fiber layer may be formed on the outer sides of open ends.

(B3) In the above embodiment, the inner surfaces of the open ends and the outer surfaces of the axial end portions are joined and the circumferential fiber layer is formed on the outer sides of the open ends. However, outer surfaces of open ends and inner surfaces of axial end portions may be joined and a circumferential fiber layer may be formed on the outer side of an axial fiber layer. In this case, at least a part or an entirety of the circumferential fiber layer may be formed on the outer side of the axial fiber layer.

The present disclosure is not limited to the above-described embodiments and modifications and can provide various configurations without departing from the spirit of the disclosure. For example, the technical features in the embodiments and modifications corresponding to the technical features in the aspects stated in the Summary section can appropriately be replaced and/or combined in order to solve some or all of the aforementioned problems or to achieve some or all of the aforementioned effects. Also, if any of the technical features is not described as being essential in the present description, such technical feature can appropriately be deleted.

What is claimed is:

1. A high-pressure tank comprising:
   a cylindrical portion including a fiber-reinforced resin;
   a dome portion including a fiber-reinforced resin; and
   a lining forming an innermost wall of the tank extending along the entire inner peripheral surfaces of the cylindrical portion and the dome portion with the exception of an opening through the dome portion to communicate with an outer space outside of the tank, wherein
   the cylindrical portion includes
      an axial fiber layer including fibers oriented in a range of zero degrees to 20 degrees relative to a center axis of the high-pressure tank, and
      a circumferential fiber layer including fibers oriented in a range of 70 degrees to 90 degrees relative to the center axis of the high-pressure tank,
   the axial fiber layer is disposed on an inner side of the circumferential fiber layer, and
   an end portion of the axial fiber layer and an end portion of the dome portion are joined to each other in a joining portion with the inner side of the circumferential fiber layer joined directly to an outer surface of the end portion of the dome portion, an inner surface of the end portion of the dome portion joined directly to an outer surface of the end portion of the axial fiber layer, and an inner surface of the end portion of the axial fiber layer joined directly to the lining.

2. The high-pressure tank according to claim 1, wherein the end portion of the dome portion is disposed between the axial fiber layer and the circumferential fiber layer.

3. The high-pressure tank according to claim 2, wherein a first part of the circumferential fiber layer is disposed on an outer side of a joining portion in which the end portion of the axial fiber layer and the end portion of the dome portion overlap with each other,
   a second part of the circumferential fiber layer is disposed on an outer side of the dome portion so as to be closer to a top of the dome portion than the first part, and
   the circumferential fiber layer does not cover an entire outer side of the dome portion.

4. The high-pressure tank according to claim 1, wherein the fibers included in the axial fiber layer are oriented in a range of zero degrees to 10 degrees relative to the center axis of the high-pressure tank, and
   the fibers included in the circumferential fiber layer are oriented in a range of 80 degrees to 90 degrees relative to the center axis of the high-pressure tank.

5. A method for manufacturing a high-pressure tank including a cylindrical portion including a fiber-reinforced resin, a dome portion including a fiber-reinforced resin, and a lining forming an inner wall of the tank extending along the entire inner peripheral surfaces of the cylindrical portion and the dome portion with the exception of an opening through the dome portion to communicate with an outer space outside of the tank, the method comprising:
   (a) a step of preparing an axial fiber layer included in the cylindrical portion, the axial fiber layer including fibers oriented in a range of zero degrees to 20 degrees relative to a center axis of the high-pressure tank, and preparing the dome portion;
   (b) a step of forming a circumferential fiber layer including fibers oriented in a range of 70 degrees to 90 degrees relative to the center axis of the high-pressure tank, on an outer side of the axial fiber layer, wherein the axial fiber layer is formed by using pultrusion; and
   (c) a step of forming a joined body by joining an end portion of the axial fiber layer and an end portion of the dome portion to each other in a joining portion with the inner side of the circumferential fiber layer joined directly to an outer surface of the end portion of the dome portion, an inner surface of the end portion of the dome portion joined directly to an outer surface of the end portion of the axial fiber layer, and an inner surface of the end portion of the axial fiber layer joined directly to the lining.

6. The method according to claim 5, wherein:
   the (b) step further includes a step of forming the circumferential fiber layer on an outer side of the end portion of the dome portion.

7. The method according to claim 6, wherein in the (c) step, the circumferential fiber layer is formed such that
   a first part of the circumferential fiber layer is formed on an outer side of a joining portion in which the end portion of the axial fiber layer and the end portion of the dome portion overlap with each other,
   a second part of the circumferential fiber layer is formed on an outer side of the dome portion so as to be closer to a top of the dome portion than the first part, and
   the circumferential fiber layer does not cover an entire outer side of the dome portion.

8. The method according to claim 5, wherein
   the fibers included in the axial fiber layer are oriented in a range of zero degrees to 10 degrees relative to the center axis of the high-pressure tank, and
   the fibers included in the circumferential fiber layer are oriented in a range of 80 degrees to 90 degrees relative to the center axis of the high-pressure tank.

* * * * *